United States Patent [19]

Leonard

[11] Patent Number: 5,313,262
[45] Date of Patent: May 17, 1994

[54] SYSTEMS AND METHODS FOR OBJECT DETECTION USING BEAM WIDENING OPTICS

[75] Inventor: Carl D. Leonard, Ann Arbor, Mich.

[73] Assignee: IMRA America, Inc., Ann Arbor, Mich.

[21] Appl. No.: 953,250

[22] Filed: Sep. 30, 1992

[51] Int. Cl.⁵ .............. G01C 3/08; G01C 3/00; G01B 11/26; B60T 7/16
[52] U.S. Cl. ...................... 356/5; 180/169; 356/1; 356/141
[58] Field of Search ............ 180/169; 356/1, 4, 5, 356/141, 152

[56] References Cited

U.S. PATENT DOCUMENTS

| 3,453,035 | 7/1969 | Walther | 350/9 |
|---|---|---|---|
| 3,540,791 | 11/1970 | Caulfield | 350/3.5 |
| 3,822,930 | 7/1974 | Douklias | 350/162 |
| 4,528,563 | 7/1985 | Takeuchi | 180/169 |
| 4,757,450 | 7/1988 | Etoh | 180/169 |
| 4,902,126 | 2/1990 | Koechner | 356/5 |
| 5,162,643 | 11/1992 | Currie | 356/152 |
| 5,163,319 | 11/1992 | Spies et al. | 356/376 |
| 5,166,681 | 11/1992 | Bottesch et al. | 180/167 |

FOREIGN PATENT DOCUMENTS

0197148  8/1989  Japan .................... 180/169

OTHER PUBLICATIONS

"Design Method for an Automotive Laser Radar System and Future Prospects for Laser Radar", by Manabu Sekine et al, *Proceedings of the Intelligent Vehicles '92 Symposium*, Jun. 29-Jul. 1, 1992, pp. 120-125.

"A Collision-Avoidance Warning System Using Laser Radar", by Kiyoshi Minami et al, Copyright 1988—Society of Automotive Engineers, Inc., pp. 1-7.

"Development of a Laser Radar System for Automobiles", by T. Yanagisawa et al, pp. 73-85.

*Primary Examiner*—Stephen C. Buczinski
*Attorney, Agent, or Firm*—Burns, Doane, Swecker & Mathis

[57] ABSTRACT

In exemplary embodiments, a diffraction grating is placed in the beam path of the generated light source. The grating expands the beam's field of view by distributing the transmitted radiation into plural sub-fields. Sub-fields associated with distant objects are set to a greater intensity to ensure reflection of the sub-fields back to the receiver. Sub-fields directed to closer objects have a lesser intensity to avoid detection of false objects.

23 Claims, 5 Drawing Sheets

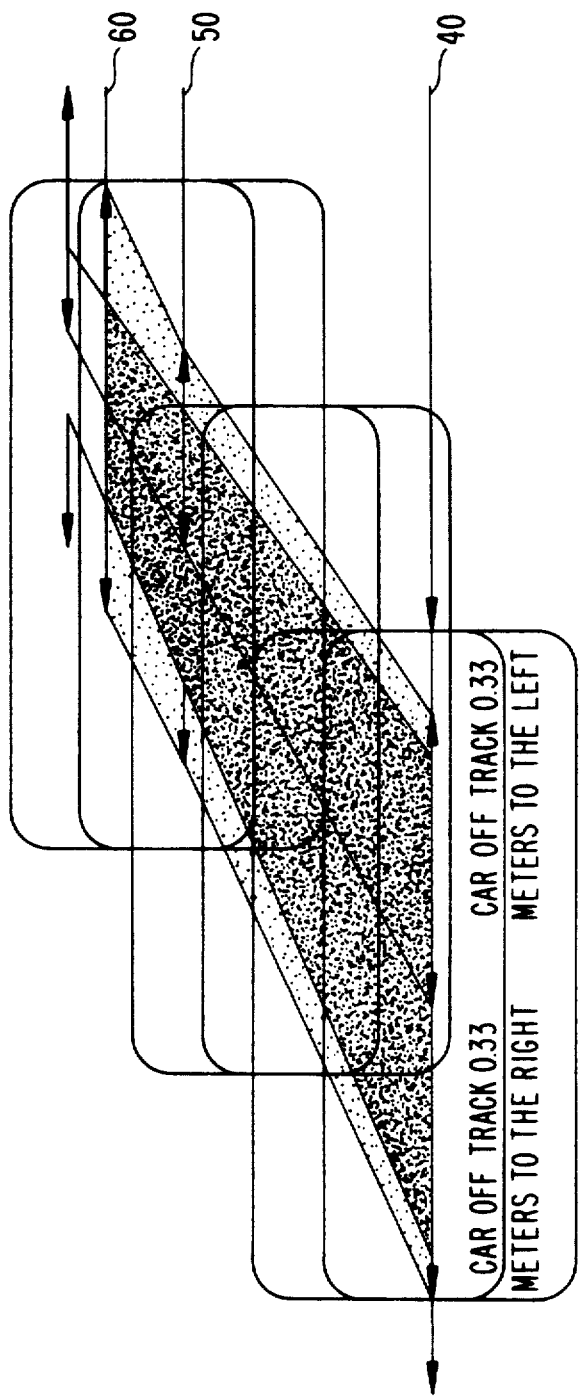

SYSTEMS AND METHODS FOR OBJECT DETECTION USING BEAM WIDENING OPTICS

BACKGROUND OF INVENTION

1. Field of the Invention

The present invention relates to systems and methods for detecting objects, and more particularly, to systems and methods for detecting objects to control a vehicle.

2. State of the Art

Systems have been developed which use a low power diode laser at near infrared wavelengths for vehicle (e.g., automobile) control. An exemplary system is described in "Design Method for an Automotive Laser Radar System and Future Prospects for Laser Radar" by Sekine et al. in *Proceedings of the Intelligent Vehicles '92 Symposium*, Jun. 29–Jul. 1, 1992, Detroit, Mich., pp. 120–125.

Several problems commonly arise when these systems are used for detecting objects such as retro-reflector markers located along a path over which a vehicle is to be guided. For example, to ensure the detection of the objects, a beam must be generated with a relatively large field of view (i.e., wide beam path). The field of view of a beam is typically widened by changing the focus of a transmitter lens or by splitting the beam into a plurality of lower intensity beams. For example, U.S. Pat. No. 4,902,126 (Koechner) discloses an obstacle avoidance system where a field of view is increased by splitting a laser beam into a plurality of beams of lower power.

A problem with the foregoing approach is that achieving wider fields of view by splitting the original beam or by defocusing the beam typically results in an undesirable decrease in the radiation received by an object in the field. Thus, although the field of view may be expanded by increasing the "blur spot" (e.g., beam that is 40% wider and taller at the expected location of an object), the intensity of the field decreases and the reflections become difficult to detect. For example, detection using slower CCD technology with prolonged integration time would be susceptible to noise (e.g., sunlight).

An alternate solution reduces the need for a wide field of view by aligning the system to operate in a set configuration whereby the field of view is relatively fixed with respect to an expected location of a retro-reflector. However, a system configuration is rarely fixed. For example, a change in vehicle (e.g., automobile) load by adding or subtracting passengers to the back seat, or otherwise changing the weight in the vehicle, causes the angle of the transmitted beam to change relative to the expected location of an object such that a marker formerly within the beam's field of view may no longer be in the field of view.

When the intensity of the beam is increased to accommodate an increased field of view (i.e., so that distant objects in the field can still be detected), problem arise with detecting objects close to the beam source (i.e., near field signals). The increased intensity of a signal at close distances from the vehicle may be so substantial that locations along a vehicle path where no reflector is present can cause a false return. A false return can adversely affect the vehicle guidance control, causing the vehicle to stray from the desired vehicle path.

One solution to this problem, as described in the Sekine et al. article, reduces the signal by turning down the gain for the signal during the early time (i.e., fast time) of the return. This method however, is only effective for a system which has a fast time response. In a system which measures azimuth angles to guide a vehicle there may be no way to inhibit the early return signals.

SUMMARY OF INVENTION

The present invention overcomes the aforementioned drawbacks by expanding the field of view with a light separating means to permit plural objects to be detected simultaneously. In exemplary embodiments, a diffraction grating is placed in the beam path of the generated light source. The grating expands the beam's field of view by distributing the transmitted radiation into plural sub-fields. Sub-fields associated with distant objects are set to a greater intensity to ensure reflection of the sub-fields back to the receiver. Sub-fields directed to closer objects have a lesser intensity to avoid detection of false objects.

In an exemplary embodiment, the invention relates to a system for detecting an object comprising: means for generating a beam of light; means for separating said beam of light into a plurality of sub-fields, each of said sub-fields being transmitted with a different intensity; and means for receiving portions of at least one of said sub-fields to detect said object.

According to another embodiment, the present invention relates to a system for controlling a moving vehicle comprising: means for generating a beam of light from said vehicle; separating said beam of light into plural transmitted sub-fields, a first of said transmitted sub-fields being oriented toward an expected location of a first object while a second of said transmitted sub-fields is oriented toward an expected location of a second object; means on said vehicle for simultaneously receiving reflected portions of at least two of the transmitted sub-fields of varying intensity; and means, responsive to said receiving means, for controlling said vehicle position relative to said first and second objects.

Several types of separating means can be used, including a transmission ruled grating, a low frequency holographic grating, a reflection grating, a prismatic lens or a prism. The control means can be included for vehicle guidance or collision avoidance based on the reflected fields. Markers located along a path of the moving vehicle can be used to reflect the sub-fields to the vehicle.

BRIEF DESCRIPTION OF THE DRAWINGS

The present invention will now be described in more detail with reference to preferred embodiments of the present invention, given only by way of example, and illustrated in the accompanying drawings, in which:

FIG. 5 represents the field of view shown in FIG. 4a during vehicle guidance.

DETAILED DESCRIPTION OF THE PREFERRED EMBODIMENTS

While the following description is in the context of vehicle systems (e.g., automobile control systems), it will be apparent to those skilled in the art that the present invention can be applied to other object detection applications. For example, the object detection system can merely be used to detect the position of an object relative to a given reference point for any purpose, including collision avoidance and/or automobile guidance.

According to an exemplary vehicle guidance embodiment of the present invention, a system is used to detect markers placed at periodic distances along a vehicle path to provide information for vehicle control. An exemplary vehicle control system which employs a low power laser as a light beam generating means is described in commonly assigned, copending U.S. patent application Ser. No. 661,001, the contents of which are hereby incorporated by reference in their entirety.

Figure 1A:
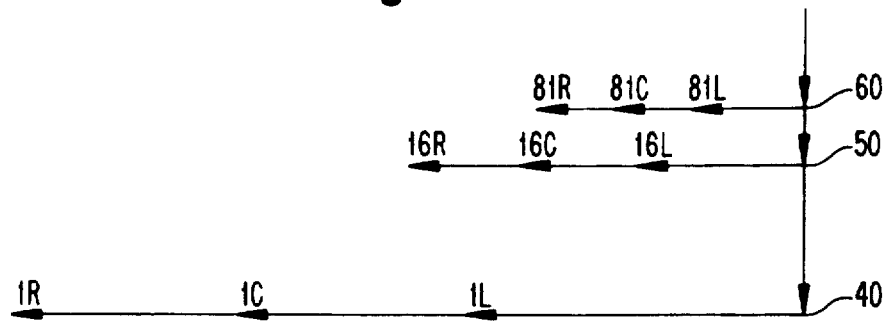
FIG. 1a shows an exemplary positioning of three markers for use with an object detection system.

Typically, the markers are reflectors spaced by a predetermined distance along the vehicle path, but any type of light reflective medium can be used. In an exemplary system, the markers are spaced eight meters apart such that for any position of the vehicle, the vehicle can detect at least three successive markers to identify a contour of the path. Thus, when the vehicle is positioned adjacent a marker, one marker will be eight meters in the forward path from the vehicle, another marker will be sixteen meters from the vehicle and a third marker will be twenty four meters from the vehicle. Such a configuration of markers is shown in FIG. 1a which is a graphical layout of the detectable marker location for a vehicle located below the lower horizontal line including 1c, with the vehicle path being represented by the vertical line. A target marker is located somewhere on each of the three horizontal lines shown. The marker labelled "X" represents a marker located at the horizon (e.g., an infinite position from the vehicle such that it appears to be located on the vehicle path). The further a marker is located from the vehicle along a straight path, the closer the marker appears to the path, (i.e., the angle of a line drawn from the marker to the vehicle, relative to the vehicle path, becomes smaller). Thus, the angle of an expected marker location with respect to the vehicle is proportional to the distance of the marker from the vehicle for a vehicle path that is straight as illustrated in FIG. 1a.

Along each horizontal line are three points (81R, 81C, and 81L; 16R, 16C, and 16L; 1R, 1C, and 1L). The center points indicate the location of the markers "seen" by the vehicle if the vehicle is in the center of the vertical path or track. Thus, if the vehicle is on track then each of the center points represent the point of reflection. The non-center points represent the location of the markers if light generating means is not aligned with the markers (e.g., the vehicle is off the track or if a curve exists along the vehicle path).

In the example of FIG. 1a, the displacement to the left (81L, 16L and 1L) or the right (81R, 16R, and 1R) of center is 0.5 meters. The light generating means laser is 0.63 meters above the ground and, when positioned along the vehicle path adjacent a marker, is 1.2 meters from the marker (i.e., 1.7 meters from the marker for the right point 1R shown in FIG. 1a and 0.7 meters from the marker for the left point 1L shown in FIG. 1a.

As mentioned, the point "X" in FIG. 1a is the infinity point for a line of markers trailing off to the far field. For a laser source positioned on the vertical path at a location adjacent the marker 1C, the relative intensities of light which must be emitted toward each of the three exemplary markers for the receiver to detect the same intensity from each marker are 81:16:1. These relative intensities will, of course, vary depending on the exact type of reflectors used. The light emitted at the far field marker 81c must be 81 times stronger than the light emitted at the near field marker. In radar systems, signal energy varies to the 4th power. Specifically, the light emitted at a marker varies as a square, and the reflected light varies as a square of a square, i.e., $((y)^2)^2$, where y is the marker number. Therefore, the required intensity which must be emitted toward the third marker is $((3)^2)^2 = 81$, times stronger, and the "4th power law" requires a relatively high intensity laser source to detect a far field detector located approximately 24 meters from the vehicle. However, this high intensity source causes detectable light reflections from non-marker objects or surfaces near the vehicle. Reflections from these near objects or surfaces are often mistakenly detected by the receiver as the near field reflector.

Figure 1B:
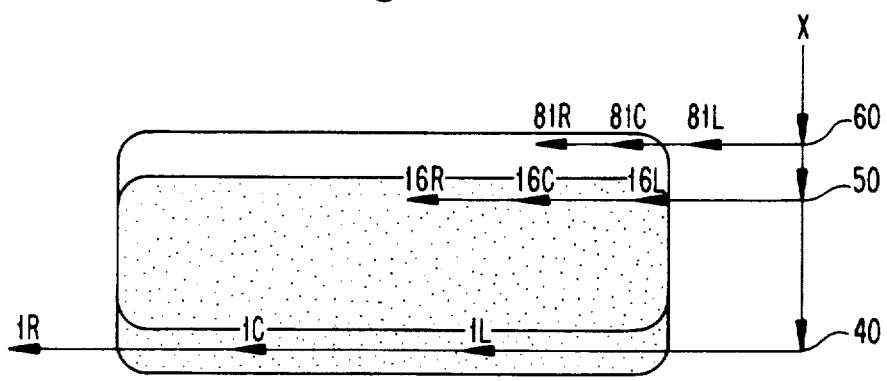
FIG. 1b shows a field of view established according to a prior art system.
Figure 2:
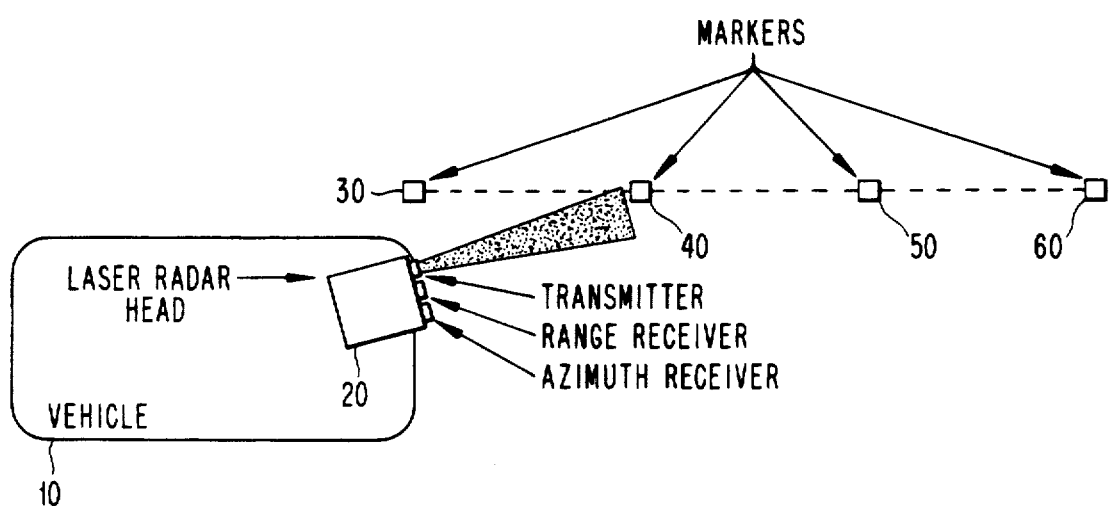
FIG. 2 shows an exemplary configuration of a known system for vehicle guidance.

In a known system shown in FIG. 2, there is a vehicle 10 including a laser unit 20 for detecting a set of markers 30, 40, 50 and 60 spaced along a vehicle path. The field of view of this system is depicted by the shaded area in FIG. 1b. Those skilled in the art will recognize that the approximately rectangular field of view created by the laser unit 20 is a conventional field of view which is established by laser diodes units readily available.

If, for example, two passengers are located in the back seat of the vehicle resulting in a vertical displacement of the laser diode unit by 0.66 degrees, the shaded area in FIG. 1b is illuminated, the field being 8.2 degrees wide, with a height of approximately 3 degrees instead of the 3.4 degrees necessary to see all three markers (See FIG. 1b where the FIG. 1a marker locations have been reproduced with respect to the FIG. 1b field of view). This system can illuminate only 2 markers at a time. When no passengers are in the vehicle, the eight and sixteen meter markers are detected. However, when two passengers are in the back seat of the vehicle the position of the laser beam is altered and only the sixteen and twenty four meter markers are detected.

Even if the system is configured to "see" all three markers, the addition or subtraction of passengers from the back seat of the vehicle will likely cause the system to see only two markers.

An expansion of the FIG. 1b field of view to ensure that all three detectors are seen regardless of vehicle loading would greatly diminish the intensity of the field at any given point, rendering the far field marker undetectable. Any increase of laser power to detect the far field will diminish the effectiveness of detecting the near field marker since non-marker objects in close proximity to a vehicle are likely to be mistaken for markers.

Figure 3:
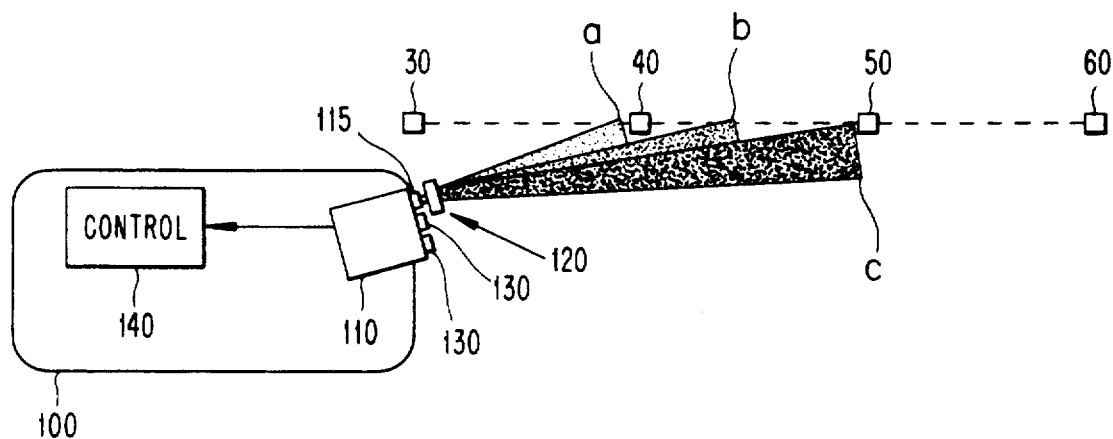
FIG. 3 shows an exemplary configuration of a system according to the present invention.

The present invention expands the field of view without encountering the aforementioned drawbacks in order to detect all three markers. FIG. 3 represents an apparatus for carrying out the present invention. Within a vehicle 100, there is light beam generating means, such as a diode laser 110, for generating a beam of light. The diode laser 110 emits a narrow, rectangular region of coherent light. A transmitting lens (not shown) can be placed in the beam path. In this case, the diode laser can be the laser described in the aforementioned commonly assigned U.S. patent application to produce the rectangular field of view by passing the three beams through a lens. By moving the lens closer to the diode laser 110, the beam can be spread out of focus in the pattern of the existing system shown in FIG. 1b which, as discussed, likely results in only two markers being illuminated.

In accordance with the present invention, an additional separating means, such as a grating 120, is placed in the beam path of the transmitter optics (i.e., the path of the diode laser 110 and any transmitting lens 115) for separating the beam of light (represented by the rectangular field of view in FIG. 1a) into plural transmitted sub-fields. Although a transmission grating has been mentioned, any beam separating means can be used. For example, a reflection grating, a prismatic lens or a prism can also be used. Another type of grating usable for the present invention is a low frequency holographic grating.

Known optical filters can also be used with the receiving means (e.g., 130) to improve the detection of sub-fields of varying intensities. Further, filters and/or baffles can be used to block various reflections in the optical train of the receiver optics, such that the transmitted laser beam can be detected but other radiation (i.e., outside the transmitted wavelength) can be blocked. These latter techniques can be used to improve detection of the transmitted sub-fields in accordance with the present invention.

A vehicle control system 140 can respond to signals detected by the receiving means 130 to provide vehicle control based on the detected distance and angular orientation of any number of objects (e.g., markers 30, 40 and 50) located within one or more sub-fields in a manner similar to that described in the aforementioned commonly assigned, copending U.S. application.

The exemplary FIG. 1b field with the laser having a nominal wavelength of 850 nm and with a track curvature up to ±900 meters, can be broken into at least three sub-fields a, b, and c as shown in FIG. 3. Although the three sub-fields may be of equal intensity, an alternate embodiment establishes three orders a, b and c of unequal power (i.e., different intensity). In this alternate embodiment, the sub-fields a, b and c are each of a power which is less than the originally transmitted beam.

Figure 1C:
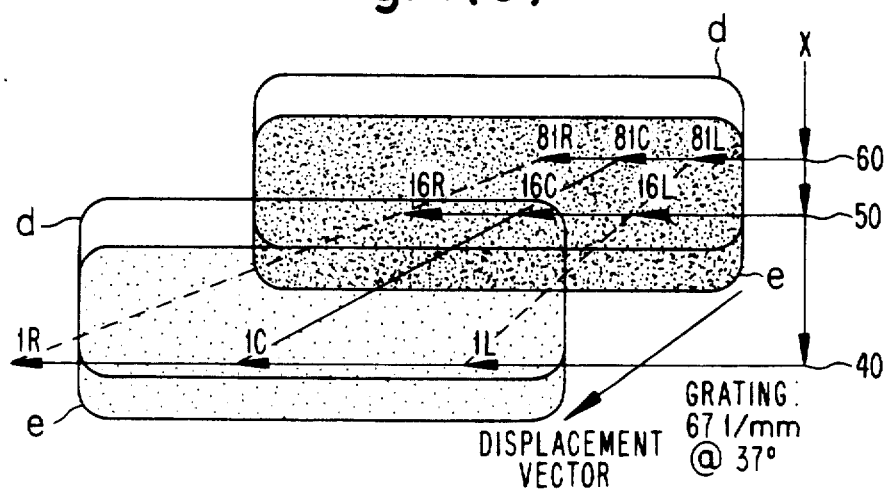
FIG. 1c shows a field of view established by a system according to the present invention.

The power of each order required for a specific application can be selected on a trial and error basis. The sub-field illumination intensity for the most distant target is set to the intensity of the system without the grating 120. Although only three sub-fields are used to detect markers in accordance with the exemplary embodiment described herein, any number of sub-fields can be created and any or all of the sub-fields created can be used for object detection. Each sub-field can be used to detect the distance and angular orientation of any number of objects located within the sub-field in a manner similar to that described in the aforementioned commonly assigned U.S. patent application. FIG. 1c illustrates use of two overlapped sub-fields for detecting the three markers of FIG. 1a.

The sum of the overall sub-field dimensions shown in FIG. 1c (i.e., composite field), including their overlap, is greater than the dimensions of the single field provided in FIG. 1b. A receiver 130 (FIG. 3) on the vehicle 100 can simultaneously receive reflected portions of at least one of a plurality of the sub-fields. In FIG. 1c, sub-fields are reflected from the markers 40, 50 and 60 for detecting the range and/or angle of each marker relative to the location of the object and the light generating means. Output of the receiving means can be used for controlling the vehicle in a manner similar to that described in the aforementioned co-pending application.

The diffraction grating 120 placed in the beam of the transmitter optics can be used to diffract the light to orders out to any number of orders (e.g., the ±5th order) to create the sub-fields. The beam can thus be separated into a series of overlapped sub-fields. One could include the sub-fields of view for any number of orders, but the power in various sub-fields may be of increasingly lower value and therefore unusable for detecting an object. The exact number of sub-fields created, the number of sub-fields used for object detection and the amount of overlap between sub-fields can be determined on a trial and error basis.

Figure 6A:
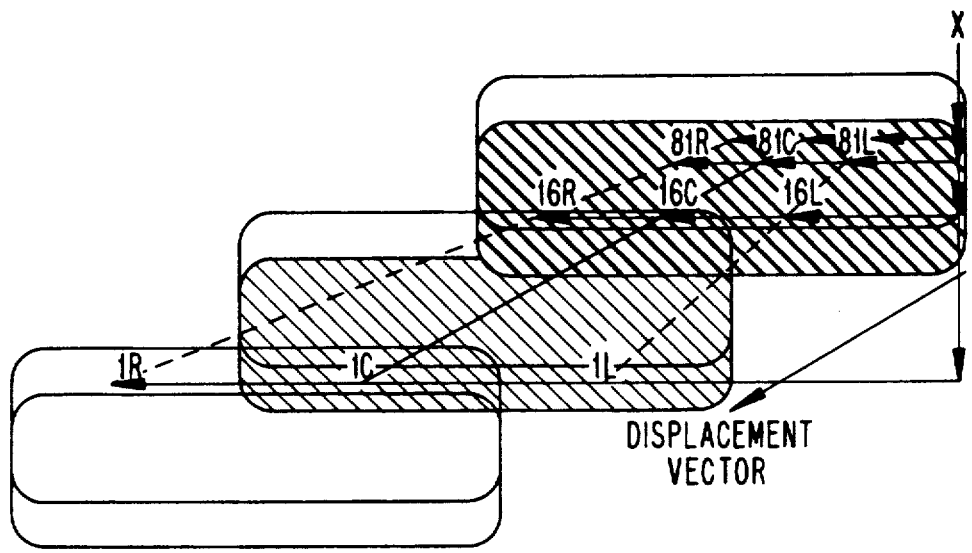
FIGS. 6a and 6b represents sub-fields in accordance with other embodiments of the invention.

A commercially available grating which is adaptable to the present invention is produced by Milton Roy Co. and can diffract a laser beam with a wavelength of 850 nm. The Milton Roy transmission ruled grating has approximately 6 sub-fields or orders, of which three are used for object detection as shown in FIG. 6a.

Typically, a transmission ruled grating is made with a "ruling engine", a precise instrument with a diamond tip which scribes straight lines on aluminum. The engine translates the diamond a small distance to scribe lines ("rule") in a master grating of aluminum. Replicas of the master grating are manufactured by pouring epoxy onto the master. The angle of the saw tooth in the master is called the "blaze angle". Commonly, the manufacturer maintains the master, so customers can order gratings with a certain blaze angle and a certain number of ruled lines/mm. Gratings can be made with practically any dimensions, including for example 50, 75 or 100 ruled lines/mm according to desired performance characteristics.

The selection of the proper blaze angle for the grating is often determined by trial and error. However, this determination can be simplified if the distribution of power in the specified orders and the number of sub-fields to be detected (e.g., 2–4) is known beforehand. An exemplary request might include the following specifics: at least 60% for the first order used for the farthest marker, at least 10% for the second order, at least 3% for the third order, and at least 1% for the fourth order.

By placing the grating 120 in the beam path, multiple images of "blur patterns" are formed and transmitted to the markers 40, 50 and 60. FIG. 1c exemplifies how targets may be illuminated using two sub-fields according to the present invention. There are shown two sub-fields, each of which has a displaced field d corresponding to a load differential. As described above, when people sit in the back seat, the field of view can be displaced upward on average approximately one-third degree per person.

As shown in the FIG. 1c embodiment, a grating grooves of 67 ruled lines/mm at an angle (displacement vector) of 37 degrees from a horizontal line, can be used to increase the composite field of view shown in FIG. 1b from 8.2 degrees wide by 3 degrees high to 9.8 degrees by 4.6 degrees in FIG. 1c. Further, the intensity in the sub-field used to detect the far field marker in FIG. 1c is increased 1.3 times relative to the FIG. 1b field by adjustment of the focus of the transmitting lens 115

(e.g., FIG. 3). The sub-field used to detect the near field marker is reduced in intensity relative to the FIG. 1b field via the grating 120 (FIG. 3). Each sub-field is approximately 7.2 by 2.6 degrees as shown in FIG. 1c. In FIG. 1c, although each individual sub-field is smaller than the single field in FIG. 1b the composite of the sub-fields in FIG. 1c is greater than FIG. 1b, i.e., 9.8 degrees by 4.6 degrees in FIG. 1c versus 8.2 degrees by 3.0 degrees in FIG. 1b.

Figure 4A:
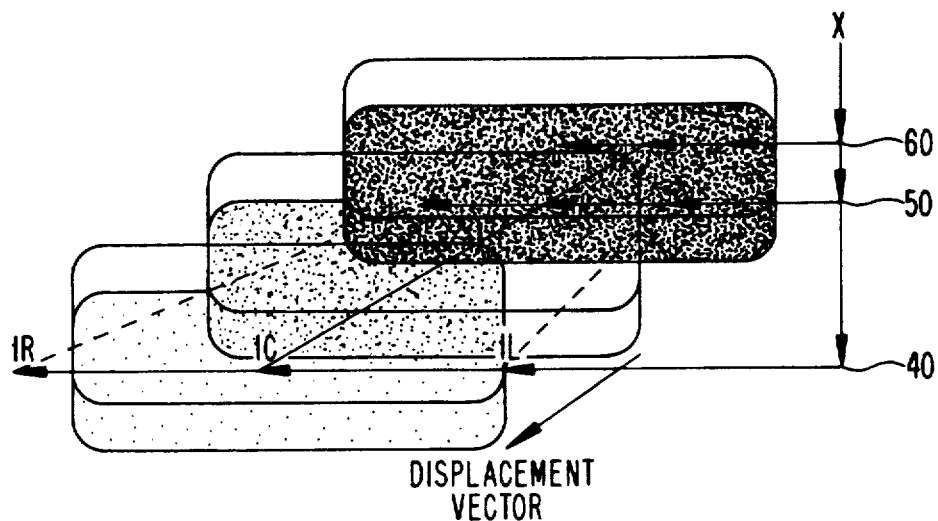
FIGS. 4a–4c represent the sub-fields established according to embodiments of the present invention.

In FIG. 4a, the field dimensions of a system with three sub-fields (corresponding to three orders of a grating) to detect the three markers of FIG. 1a is shown. The invention can be extended to cover additional sub-fields as needed. As shown in FIG. 4a, the composite area using three sub-fields is improved further. The grating used in the FIG. 4a embodiment has a spacing between grooves of 49 lines/mm with a displacement angle of 34 degrees. The field increases to 10.2 degrees by 4.9 degrees with each sub-field being 6.2 degrees by 2.3 degrees and the overall intensity of the sub-field used for the far field marker increases by a factor of 1.75 times. However, the composite intensity of the fields in FIG. 4a is roughly the same as the FIG. 1c embodiment with the far sub-field having the highest intensity in both cases.

There are areas in FIG. 4 where the sub-fields overlap. These areas of overlap have a slightly higher composite intensity than the non-overlapping portions of the sub-fields. To extend the overall composite field area, the areas of overlap are preferably minimized so that the markers can be detected with a desired number of sub-fields. Otherwise, the system may not be able to cover each of three markers when parameters (e.g., load differential) change. However, some overlap is desirable to ensure that no undetectable marker positions exist between the various sub-fields.

Further, plural sub-fields may be used to detect a near field marker which, relative to the FIG. 3 vehicle will appear to be spaced by a relatively large distance. On the contrary, a lesser number of sub-fields (e.g., one) can be used to detect one or more far field objects, as these objects will appear closer together relative to the vehicle.

Figure 4B:
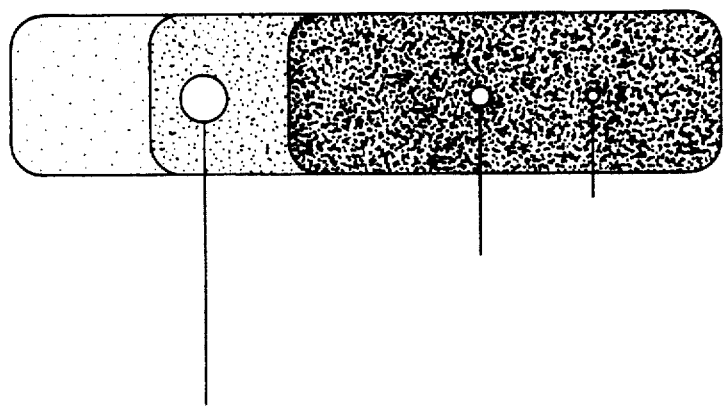

FIG. 4b illustrates use of the FIG. 4a sub-fields to detect a position of a vehicle with respect to markers located along the side of the vehicle path, with the marker being at the same height the light generating means is mounted above the ground on the vehicle. These locations of the markers above the ground would, for example, permit detection of markers above snow drift. The separating means would, for example, be a grating with 41 lines/mm and a 0 degree displacement angle.

Figure 4C:
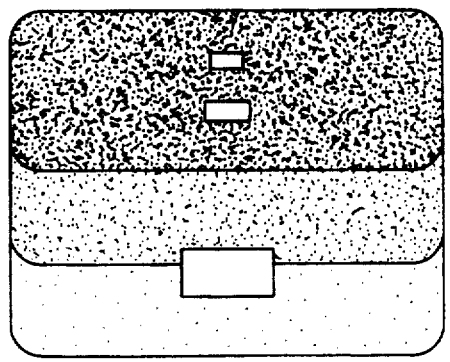

FIG. 4c illustrates how the FIG. 41 sub-fields can be used for a vehicle guidance system where reflectors are placed in the middle of (as opposed to along the side of) a vehicle path. In this embodiment, the light generating means can be located along a center axis of the vehicle and a grating of 27 lines/mm with a displacement angle of 90 degrees can be used. Such an embodiment can be used, for example, to assist in landing airborne vehicles (i.e., aircraft).

In FIG. 5, the resulting sub-fields of the FIG. 4a embodiment are shown to illustrate vehicle guidance control errors. The area outlined by the dotted lines corresponds to the vehicle's track variance, while the area outlined by the dashed lines corresponds to the allowance for the track curvature. This embodiment exemplifies that the composite field of view can be extended to cover scenarios when the car is off the track or when curves exist in the travel path. While the FIG. 1c system accounts for a 0.5 meters deviation to the right or left, the FIG. 5 embodiment accounts for a curvature and a general position error with respect to the marker. For example, the system can handle approximately 0.33 meters deviation for a radius of curvature of approximately ±600 meters.

The potential for false signals from reflections is minimized according to the present invention. In the exemplary embodiment of FIG. 6a, using a "blazed grating" with 75 lines/mm, the blaze angle is 4.3 degrees (4 degrees 18 minutes). This blaze angle provides sub-fields having intensities of 67.4%, 13.9% and 4.1% of incident radiation at the laser wavelength of 850 nm, in the plus first, zeroth and minus first orders, respectively. The remaining light from the diode laser is diffracted into sub-fields which are not used to detect the three markers. The receiver sees or receives approximately the same intensity from the near and far markers; e.g., the first marker reflection intensity may be a few times greater (this factor may vary based on differential loading or on reflectors characteristics) than the third marker reflection intensity and not 81 times greater when the sub-field having 67.4% of the original power is being used for the far field marker.

Each of the FIG. 6a sub-fields used are approximately 6.9 degrees by 2.1 degrees. The composite field is approximately 10.1 degrees by 4 degrees when two sub-fields are used. The composite field is increased to 13.4 degrees by 6.5 degrees when three of the sub-fields created are used for object detection.

Figure 6B:
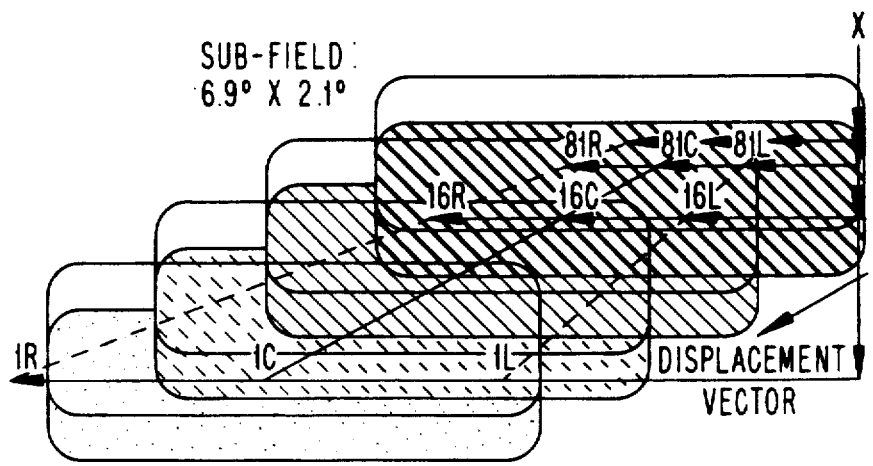

FIG. 6b shows yet another exemplary embodiment wherein four of the sub-fields created via a transmission grating with 35 lines/mm and an angular displacement of 30 degrees are used for object detecting and vehicle control. Here, each of the sub-fields is approximately 6.9 degrees by 2.1 degrees, with four of the sub-fields creating a composite field of approximately 11.4 degrees by 4.7 degrees.

As mentioned above, other embodiments can use a reflecting grating (as opposed to a transmission grating) for establishing plural sub-fields. Those skilled in the art will recognize that the geometry of the transmission optics should be modified to ensure that the beam does not reflect on itself, but reflects at an angle toward expected locations of objects along the vehicle path (e.g., to the left side of the vehicle). A reflection grating is similar to reflecting light off a mirror as opposed to transmitting light through clear glass.

A light receiving means is preferably mounted on the vehicle for receiving the reflected sub-fields from the markers. Any type of light detecting element may be employed. Once the light is detected by the receiving means, the detected signals are processed by a controller. The detected signals can be used to detect the position of the vehicle relative to the detected objects, and can be used to maintain the vehicle on a desired path. Based on the received signals, the controller controls the vehicle to operate in a desired manner. Similarly, plural sub-fields can be generated at different angles from the vehicle for detecting any object (e.g., other vehicles) to provide collision avoidance.

Those skilled in the art will recognize that any desired sub-field and/or composite field shape can be used to detect objects. The rectangular sub-fields of relatively long width and short height are merely exemplary. Similarly, the use of sub-fields which are transmitted at a relatively sharp angle for near field detection and at a shallow angle for far field detection are considered exemplary for use in vehicle guidance where markers are located at fixed separation distances along the side of a vehicle path. Specific applications will dictate modifications to these exemplary composite fixed configurations to optimize detection.

While particular embodiments of the present invention have been described and illustrated, it should be understood that the invention is not limited thereto since modifications can be made by persons skilled in the art. The present application contemplates any and all modifications that fall within the spirit and scope of the underlying invention disclosed and claimed herein.

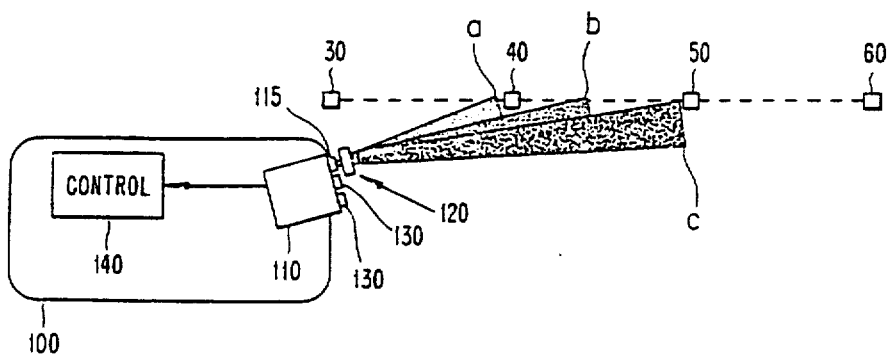

What is claimed is:

1. System for detecting an object comprising:
   means for generating a beam of light;
   means for separating said beam of light into a plurality of sub-fields, each of said sub-fields being transmitted with a different intensity, each different intensity being proportional to a distance from said light beam generating means to an expected location of said object; and
   means for receiving portions of at least one of said sub-fields to detect said object.

2. The system of claim 1 wherein each of said sub-fields is directed at an angle which is proportional to the expected location of one of a plurality of objects along a path.

3. The system of claim 1, wherein said object is detected for controlling a vehicle by generating said beam of light from said vehicle, said receiving means being located on said vehicle for receiving portions of at least some of said transmitted sub-fields of different intensity to control the vehicle.

4. The system of claim 3 further including means, responsive to said receiving means, for guiding said vehicle based on each of said received portions.

5. The system of claim 4 wherein said separating means is a grating for separating said beam of light into at least three diffracted sub-fields which are each directed at a different angle with respect to said vehicle, each different angle being proportional to an expected location of one of a plurality of objects along a path of said vehicle.

6. The system of claim 5 wherein said objects located along the path of said vehicle are retro-reflectors for reflecting said diffracted sub-fields toward said receiving means.

7. The system of claim 6 wherein each of said objects are spaced a predetermined distance from one another along said path.

8. The system of claim 7 wherein said diffracted sub-field of light with a first intensity is directed toward a first one of said objects, and said diffracted sub-field with a second intensity greater than said first intensity is directed toward a second one of said objects located a greater distance from said generating means than said first one of said objects.

9. The system of claim 5 wherein said grating is a transmission ruled grating.

10. The system of claim 5 wherein said grating is a low frequency holographic grating.

11. The system of claim 5 wherein said light generating means is a diode laser.

12. The system of claim 1, wherein said light beam generating means is a single laser diode.

13. A system for controlling a moving vehicle comprising:

means for generating a beam of light from said vehicle;
means for separating said beam of light into plural transmitted sub-fields, a first of said transmitted sub-fields being oriented toward an expected location of a first object while a second of said transmitted sub-fields is oriented toward an expected location of a second object wherein said first and second sub-fields are transmitted with different intensities of light, each of said different intensities being proportional to different expected distances from said light beam generating means to said first and second objects;
means on said vehicle for simultaneously receiving reflected portions of at least two of the transmitted sub-fields; and
means, responsive to said receiving means, for controlling said vehicle position relative to said first and second objects.

14. The system of claim 13, wherein said generating means is a diode laser, said separating means is a diffraction grating, and wherein each of said plural transmitted sub-fields is transmitted with a different intensity.

15. The system of claim 14 further including at least three markers spaced along a path of said vehicle, a first one of said markers being a first distance from said vehicle for reflecting a first one of said sub-fields with a first intensity, and a second one of said markers being at a second distance from said vehicle for reflecting one of said sub-fields with a second intensity greater than said first intensity, said first distance being less than said second distance.

16. The system of claim 15 wherein each of said markers is spaced a predetermined distance from an adjacent one of said markers.

17. The system of claim 13, wherein said light beam generating means is a single laser diode.

18. A method of detecting an object, said method comprising the steps of:
   generating a beam of light;
   separating said light beam into plural sub-fields and transmitting the plural sub-fields of view using said beam, each sub-field being of a different intensity, each different intensity being proportional to a different expected distance to said object; and
   receiving portions of said plural sub-fields for detecting said object.

19. The method of claim 18 wherein a portion of said object is detected for controlling a moving vehicle, said method comprising the steps of:
   detecting said portions of said sub-fields which are reflected from a plurality of markers located along a vehicle path and controlling said vehicle based on said detected reflected sub-fields.

20. The method of claim 19 wherein said step of separating includes separating said beam into at least three sub-fields.

21. The method of claim 20 wherein a sub-field with a first intensity is directed to a first one of said markers and a sub-field with a second intensity greater than said first intensity is directed to a second one of said markers.

22. The method of claim 21 wherein a sub-field of a first intensity is reflected by one of said markers at a first distance from said vehicle and a sub-field of a second intensity greater than said first intensity is reflected by one of said markers at a second distance from said vehicle, wherein said second distance is greater than said first distance.

23. The method of claim 18, wherein said step of generating a beam of light is performed using a single laser diode.

* * * * *

UNITED STATES PATENT AND TRADEMARK OFFICE
CERTIFICATE OF CORRECTION

PATENT NO. : 5,313,262
DATED : May 17, 1994
INVENTOR(S) : Carl D. Leonard

It is certified that error appears in the above-indentified patent and that said Letters Patent is hereby corrected as shown below:

The title page, should be deleted to be replaced with the attached title page.

In the drawings, label Fig. 2 —PRIOR ART—

Signed and Sealed this

Sixteenth Day of May, 1995

Attest:

BRUCE LEHMAN

Attesting Officer

Commissioner of Patents and Trademarks

United States Patent [19]

Leonard

[11] Patent Number: 5,313,262
[45] Date of Patent: May 17, 1994

[54] SYSTEMS AND METHODS FOR OBJECT DETECTION USING BEAM WIDENING OPTICS

[75] Inventor: Carl D. Leonard, Ann Arbor, Mich.

[73] Assignee: IMRA America, Inc., Ann Arbor, Mich.

[21] Appl. No.: 953,250

[22] Filed: Sep. 30, 1992

[51] Int. Cl.$^5$ .............. G01C 3/08; G01C 3/00; G01B 11/26; B60T 7/16
[52] U.S. Cl. .................. 356/5; 180/169; 356/1; 356/141
[58] Field of Search .............. 180/169; 356/1, 4, 5, 356/141, 152

[56] References Cited

U.S. PATENT DOCUMENTS

| | | | |
|---|---|---|---|
| 3,453,035 | 7/1969 | Walther | 350/9 |
| 3,540,791 | 11/1970 | Caulfield | 350/3.5 |
| 3,822,930 | 7/1974 | Douklias | 350/162 |
| 4,528,563 | 7/1985 | Takeuchi | 180/169 |
| 4,757,450 | 7/1988 | Etoh | 180/169 |
| 4,902,126 | 2/1990 | Koechner | 356/5 |
| 5,162,643 | 11/1992 | Currie | 356/152 |
| 5,163,319 | 11/1992 | Spies et al. | 356/376 |
| 5,166,681 | 11/1992 | Bottesch et al. | 180/167 |

FOREIGN PATENT DOCUMENTS 0197148  8/1989  Japan ................... 180/169

OTHER PUBLICATIONS

"Design Method for an Automotive Laser Radar System and Future Prospects for Laser Radar", by Manabu Sekine et al, *Proceedings of the Intelligent Vehicles '92 Symposium*, Jun. 29–Jul. 1, 1992, pp. 120–125.

"A Collision-Avoidance Warning System Using Laser Radar", by Kiyoshi Minami et al, Copyright 1988—Society of Automotive Engineers, Inc., pp. 1–7.

"Development of a Laser Radar System for Automobiles", by T. Yanagisawa et al, pp. 73–85.

*Primary Examiner*—Stephen C. Buczinski
*Attorney, Agent, or Firm*—Burns, Doane, Swecker & Mathis

[57] ABSTRACT

In exemplary embodiments, a diffraction grating is placed in the beam path of the generated light source. The grating expands the beam's field of view by distributing the transmitted radiation into plural sub-fields. Sub-fields associated with distant objects are set to a greater intensity to ensure reflection of the sub-fields back to the receiver. Sub-fields directed to closer objects have a lesser intensity to avoid detection of false objects.

23 Claims, 5 Drawing Sheets